United States Patent
Moore et al.

(10) Patent No.: US 6,650,664 B1
(45) Date of Patent: Nov. 18, 2003

(54) CLADDING-PUMPED FIBER WITH HELICAL RARE-EARTH-DOPED CORE FOR FIBER LASERS AND AMPLIFIERS

(75) Inventors: Gerald T. Moore, Albuquerque, NM (US); John R. Marciante, Rio Rancho, NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/681,134

(22) Filed: Jan. 19, 2001

(51) Int. Cl.[7] .................. H01S 3/30; H01S 3/098; H01S 3/13
(52) U.S. Cl. .................. 372/6; 372/19; 372/30; 385/123
(58) Field of Search .................. 372/6, 19, 27, 372/30, 71, 73; 385/123, 124, 125

(56) References Cited

U.S. PATENT DOCUMENTS 5,452,394 A * 9/1995 Huang ............... 385/123
5,485,480 A * 1/1996 Kleinerman ............ 372/6

FOREIGN PATENT DOCUMENTS

GB 8603846 A1 2/1986

OTHER PUBLICATIONS

Koplow et al ,Single–mode operation of a coiled multimode fiber amplifier, Apr. 1, 2000, Optics Letters, pp. 442–444.*

V. Dominic, S. MacCormack, R. Waarts, S. Sanders, S. Bicknese, R. Dohle, E. Wolak, P.S. Yeh, and E. Zucker, "110 W fibre laser," Electron. Lett. 35, 1158–1160 (1999)).

J. P. Koplow, D. A. V. Kliner, and L. Goldberg, "Single–mode operation of a coiled multimode fiber amplifier," Opt. Lett. 25, 442–444 (2000).

M. P. Varnham, R. D. Birch, and D. N. Payne, "Design of helical core circularly birefringent fibers," in Technical Digest, Optical Fiber Communication Conference, Atlanta (1986).

* cited by examiner

Primary Examiner—Paul Ip
Assistant Examiner—Armando Rodriguez
(74) Attorney, Agent, or Firm—James M. Skorich; Kenneth E. Callahan

(57) ABSTRACT

A high power fiber laser/amplifier is comprised of a multimode rare-earth-doped helical core disposed within a cylindrical inner cladding. The inner cladding is enclosed within an outer cladding whereby the core effectively produces single-mode operation with a circularly polarized near-diffraction-limited beam quality output when pump radiation is injected into the inner cladding.

4 Claims, 1 Drawing Sheet

CLADDING-PUMPED FIBER WITH HELICAL RARE-EARTH-DOPED CORE FOR FIBER LASERS AND AMPLIFIERS

FEDERAL RESEARCH STATEMENT

The conditions under which this invention was made are such as to entitle the Government of the United States under paragraph I(a) of Executive Order 10096, as represented by the Secretary of the Air Force, to the entire right, title and interest therein, including foreign rights.

BACKGROUND OF INVENTION

1. Field of the Invention

This invention is in the field of fiber lasers and amplifiers, and in particular, relates to the use multi-mode, rare-earth-doped, helical core fiber to construct high-power lasers and amplifiers.

2. Description of the Prior Art

Fiber lasers and amplifiers doped with rare-earth ions such as Yb, Nd, and Er have high potential for telecommunications, military, materials-processing, and other applications. In particular, the Yb-doped fiber laser with a single-mode core can be operated efficiently at high power to produce infrared light with near-diffraction-limited beam quality (V. Dominic, S. MacCormack, R. Waarts, S. Sanders, S. Bicknese, R. Dohle, E. Wolak, P. S. Yeh, and E. Zucker, 110 W fibre laser, Electron. Lett. 35, 1158–1160 (1999)).

Yb-doped fibers are pumped by radiation from arrays of diode lasers. Since the pump radiation has poor spatial beam quality, it is not possible to inject appreciable pump power into the fiber core. Instead, high-power operation has been achieved by injecting the pump light into the fiber cladding (U.S. Pat. No. 4,815,079). Since the core area is much smaller than the cladding area, pump absorption by the Yb typically occurs over tens of meters of fiber length. It is desirable to avoid a configuration where some of the pump light spirals around in the cladding without overlapping the core. Although displacing the core from the center of the fiber was proposed in U.S. Pat. No. 4,815,079 as a way to avoid such a situation, the commonly adopted technique is to inject the pump into an inner cladding with a noncircular cross section. Variations on such dual-clad fibers have been manufactured by companies including Polaroid, Lucent, Fibercore, and INO. Most fiber lasers manufactured using dual-clad fibers produce unpolarized light, especially in high-power operation.

In order to scale to higher power and to reduce the pump absorption length, it is desirable to use fibers with a larger core area. However, increasing the core area significantly normally results in multimode operation and hence loss of good beam quality. For step-index fibers, the parameter $$V=(2\pi a/\lambda)(n_1^2-n_2^2)^{1/2}$$

determines whether the fiber supports only a single mode. Here a is the core radius, $\lambda$ is the wavelength, and $n_1$ and $n_2$ are the refractive indices of the core and cladding. Single-mode operation requires that V<2.405. Effectively single-mode operation of a fiber amplifier with V=7.4 has been achieved by coiling the fiber to induce significant bend loss for all but the lowest-order mode (J. P. Koplow, D. A. V. Kliner, and L. Goldberg, Single-mode operation of a coiled multimode fiber amplifier, Opt. Lett. 25, 442–444 (2000)). Unfortunately, coiling can also create unacceptable bend loss for the pump light.

Helical-core passive fibers were developed at the University of Southampton (U.S. Pat. No. 4,949,038). A preform with the core inserted off-axis was rotated during the drawing of the fiber. A fiber with V=25 at $\lambda$=633 nm and a pitch varying continuously from 1.5 mm to several centimeters was manufactured and found to be effectively single-mode for a pitch between 9 and 1.8 mm. Moreover, helical fiber was found to exhibit strong circular birefringence. This implies states of circular polarization tend to be preserved during propagation through the fiber. Many applications, such as nonlinear frequency conversion and coherent beam combination, require a fixed polarization state at the output of the fiber.

SUMMARY OF INVENTION

A high power fiber laser/amplifier is comprised of a multi-mode rare-earth-doped helical-coiled core disposed within a cylindrical inner cladding. The inner cladding is enclosed within an outer cladding or thick polymer jacket to confine the pump radiation injected into the inner cladding. The core effectively produces single-mode operation with a circularly polarized near-diffraction-limited beam quality output for materials processing and other applications.

BRIEF DESCRIPTION OF DRAWINGS

The various features of novelty that characterize the invention are pointed out with particularity in the claims annexed to and forming a part of this disclosure. For a better understanding of the invention, its operating advantages, and specific objects attained by its uses, reference is made to the accompanying drawings and descriptive matter in which a preferred embodiment of the invention is illustrated.

DETAILED DESCRIPTION

Figure 1B:
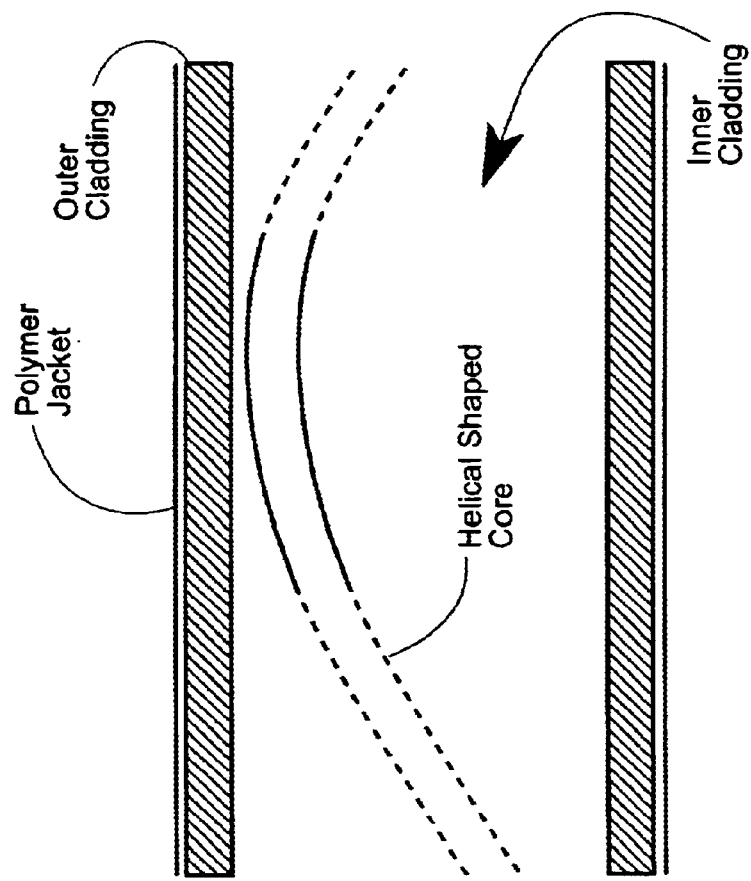
FIG. 1 shows an end view (1a) and a side view (1b) of the helical fiber of the present invention.

In the present invention, fiber with a nominally multi-mode, rare-earth-doped helical core imbedded in a cylindrical cladding is used to construct high-power fiber lasers and amplifiers. The core material can either lase, by setting up a cavity to resonate the emitted light, or amplify when the core is injected with the desired signal. The advantages to be gained by using this concept include effectively single-mode operation with a large core area, circularly polarized output, and reduced pump absorption length because of the large helical core. Besides reducing the amount of fiber required to build a fiber laser or amplifier, a short length increases the threshold for undesired nonlinear processes, such as stimulated Brillouin scattering and stimulated Raman scattering.

The core is a tube of rare-earth-doped fiber optic material that can lase when appropriately pumped. It has a circular cross-section of index of refraction $n_1$. It is disposed as a helical coil within a cylindrical fiber cladding material of index of refraction $n_2$, where $n_2<n_1$. The diameter of the core can be greater than single-mode cores, thereby producing greater lasing power or amplified output power at intensity levels below the threshold for optical damage. Because the helical shape reduces the fraction of amplified spontaneous emission trapped in the core and ejects unwanted higher-order modes, effectively single-mode operation with nearly diffraction-limited output is thus obtained with a large core diameter. Pump radiation is efficiently injected into the relatively large diameter cladding to energize the core. There is no appreciable bending loss for the pump radiation when the fiber is not tightly coiled since the cladding is cylindrical (rather than helical).

The fiber can be encased in a polymer jacket to protect it from mechanical damage. This is a standard procedure used in the manufacture of optical fibers. Optionally a glass outer cladding with index of refraction $n_3<n_2$ can be used between the jacket and the inner cladding confining the pump radiation. This outer cladding also separates the polymer jacket from the high-power pump radiation which might otherwise damage the polymer during high power operation. In cases where a smaller core is desirable, the helical geometry still has the advantage of preserving a fixed polarization state.

Although fusion splicing the core of helical fiber to the core of another fiber is made more difficult by the off-axis location and tilt of the core, the off-axis configuration provides a large free aperture for coupling of pump light from a multimode fiber spliced to the cladding of the helical fiber. This all-fiber configuration is more rugged than using free-space optics to inject the pump light. In an amplifier the core tilt will act to reduce undesirable feedback caused by reflections at the fiber ends. If the tilt angle is large enough (8 degrees or larger), reflected light is not confined by the core. In an experiment (M. P. Varnham, R. D. Birch, and D. N. Payne, Design of helical core circularly birefringent fibers, in Technical Digest, Optical Fiber Communication Conference, Atlanta (1986)) effectively single-mode operation was observed in a helical core fiber having a tapered pitch with a tilt angle typically of 8 degrees or larger. Ellipticity in the transverse profile of the transmitted output beam can be corrected by external optics.

Figure 1A:
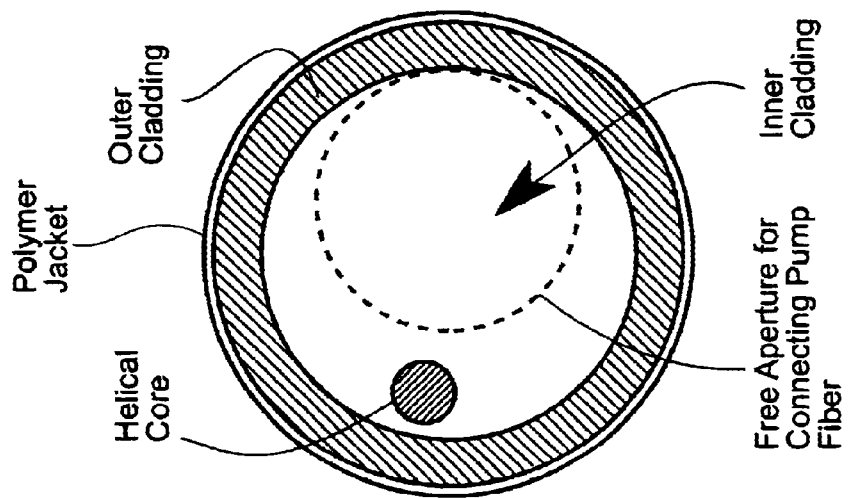

The FIG. 1 shows an end view (a) and a side view (b) of the helical fiber. Typical approximate dimensions are: Yb-doped core diameter=25 to 100 $\mu$m, cladding diameter= 125 to 1000 $\mu$m, core offset=100 to 900 $\mu$m, pitch=2 to 20 mm. Pitch is defined as the longitudinal distance over which the core azimuth undergoes one rotation. The dashed line in FIG. 1*a* shows the free aperture available for coupling to multimode fiber delivering pump light. Typically the ratio of the inner cladding diameter to the core diameter would be in the range of 4 to 40, but could extend beyond these limits. The polymer jacket would be removed from the ends of the helical fiber and pump fiber before coupling them. Alternatively, a sufficiently thick polymer jacket of index of refraction $n_3$ could be used in place of the outer cladding.

The high power fiber laser of the present invention could be used as a precision cutting tool, being much lighter and more compact than CO2 lasers currently in use.

We claim:

1. A high-power optical fiber laser/amplifier comprised of:
   a nominally multi-mode, rare-earth-doped helical-coiled core having an index of refraction $n_1$ longitudinally disposed within an inner cylindrical cladding having an index of refraction $n_2$, where $n_1>n_2$;
   an outer cladding of index of refraction $n_3<n_2$ enclosing said inner cylindrical cladding;
   an end plane including an end of said inner cylindrical cladding;
   an aperture in said end plane for connecting said inner cylindrical cladding to a source of pump radiation;
   said helical-coiled core terminating in said end plane, and being located outside of said aperture; and
   said helical-coiled core having a diameter for transmitting light in a single mode, with the diameter being greater than a maximum diameter for allowing a non-helical core to transmit light in a single mode, whereby
   said helical-coiled core effectively produces single-mode operation with a circularly polarized near-diffraction-limited beam quality output when said pump radiation source is used to inject pump radiation into said inner cylindrical cladding,
   said pump radiation does not impinge on said helical-coiled core where said helical-coiled core terminates in said end plane, and
   laser light emanating from said helical-coiled core is not transmitted to said pump radiation source.

2. The high-power optical fiber laser/amplifier of claim 1 wherein said outer cladding is replaced by a thick polymer jacket of index of refraction $n_3$.

3. The high-power optical fiber laser/amplifier of claim 1 wherein the ratio of the diameter of said inner cladding to the diameter of said helical-coiled core is in the range of 4 to 40.

4. The high-power optical fiber laser/amplifier of claim 1 wherein the tilt angle of said helical-coiled core is in the range of 8 to 40 degrees.

* * * * *